US008087599B2

(12) United States Patent
Chen

(10) Patent No.: US 8,087,599 B2
(45) Date of Patent: Jan. 3, 2012

(54) ANTI-PAPER JAM PROTECTION DEVICE FOR SHREDDERS

(75) Inventor: Xinxiong Chen, Shanghai (CN)

(73) Assignee: Aurora Office Equipment Co., Ltd., Shanghai (CN)

( * ) Notice: Subject to any disclaimer, the term of this patent is extended or adjusted under 35 U.S.C. 154(b) by 254 days.

(21) Appl. No.: 12/509,671

(22) Filed: Jul. 27, 2009

(65) Prior Publication Data

US 2010/0282879 A1 Nov. 11, 2010

(30) Foreign Application Priority Data

May 7, 2009 (CN) .......................... 2009 1 0050764

(51) Int. Cl.
*A01F 21/00* (2006.01)
*B23Q 11/00* (2006.01)

(52) U.S. Cl. ........................ 241/37.5; 241/100; 241/236

(58) Field of Classification Search .................... 241/36, 241/37.5, 100, 236
See application file for complete search history.

(56) References Cited

U.S. PATENT DOCUMENTS 606,596 A 6/1898 Strickler
3,111,800 A 11/1963 Quianthy
3,629,530 A 12/1971 Fischer
3,724,766 A 4/1973 Bosland
3,728,501 A 4/1973 Larson et al.
3,746,815 A 7/1973 Drummer
3,769,473 A 10/1973 Lay
3,780,246 A 12/1973 Beckering et al.
3,785,230 A 1/1974 Lokey
(Continued)

FOREIGN PATENT DOCUMENTS

CN 2372057 4/2000
(Continued)

OTHER PUBLICATIONS

Andrew J. Scarlett et al., Guard interlockling for self-propelled harvesting machinery, Silsoe Research Institute, HSE Book 2002.

(Continued)

*Primary Examiner* — Bena Miller
(74) *Attorney, Agent, or Firm* — Wang, Hartman, Gibbs & Cauley, PLC; John F. O'Rourke; Erik P. Wolf

(57) ABSTRACT

The present invention relates to an anti-paper jam protection device for shredders comprising a paper thickness detecting device, an indicating device and a controlling device, wherein the paper thickness detecting device is an electromagnetic induction paper thickness detecting device comprising a contact element, an electromagnetic element and an electromagnetic induction element, the contact element is connected rotatably to the body of the shredder, one end of which is positioned in the paper inserting passage, on the other end of which is mounted the electromagnetic element, the electromagnetic induction element is mounted on the body of the shredder and spaced with the electromagnetic element face to face, and the controlling device is in line connection with the electromagnetic induction element, the present invention controls the thickness of the paper to be shredded during the paper inserting stage, and shreds paper automatically only in a predetermined value range, to avoid abnormalities that result in failure of the machine such as jam and tooth breaking when the shredder is shredding many pieces of paper, so as to reduce maintenance times and cost, extend service life, and make application of shredders safer and more reliable, more convenient and simpler, then to achieve better protection of shredders.

10 Claims, 3 Drawing Sheets

U.S. PATENT DOCUMENTS

| | | | |
|---|---|---|---|
| 3,829,850 | A | 8/1974 | Guetersloh |
| 3,860,180 | A | 1/1975 | Goldhammer |
| 3,873,796 | A | 3/1975 | Worobec, Jr. |
| 3,947,734 | A | 3/1976 | Fyler |
| 3,952,239 | A | 4/1976 | Owings et al. |
| 3,953,696 | A | 4/1976 | Reimann et al. |
| 3,971,906 | A | 7/1976 | Sahrbacker |
| 4,002,874 | A | 1/1977 | Brown |
| 4,016,490 | A | 4/1977 | Weckenmann et al. |
| 4,018,392 | A | 4/1977 | Wagner |
| 4,062,282 | A | 12/1977 | Miller et al. |
| 4,068,805 | A | 1/1978 | Oswald |
| 4,082,232 | A | 4/1978 | Brewer |
| 4,107,484 | A | 8/1978 | Petersen, III |
| 4,117,752 | A | 10/1978 | Yoneda |
| 4,125,228 | A | 11/1978 | Brewer |
| 4,135,068 | A | 1/1979 | Burns |
| 4,162,042 | A | 7/1979 | Mommsen et al. |
| 4,172,400 | A | 10/1979 | Brierley |
| 4,180,716 | A | 12/1979 | Suzuki |
| 4,187,420 | A | 2/1980 | Piber |
| 4,194,698 | A | 3/1980 | Kosmowski |
| 4,262,179 | A | 4/1981 | Bauer |
| 4,276,459 | A | 6/1981 | Willett et al. |
| 4,277,666 | A | 7/1981 | Vignaud |
| 4,349,814 | A | 9/1982 | Akehurst |
| 4,423,844 | A | 1/1984 | Sours et al. |
| 4,449,062 | A | 5/1984 | Wilson |
| 4,471,915 | A | 9/1984 | Levin et al. |
| 4,510,860 | A | 4/1985 | LaBarge et al. |
| 4,518,958 | A | 5/1985 | Cook et al. |
| 4,549,097 | A | 10/1985 | Ulmer |
| 4,562,971 | A | 1/1986 | Schwelling |
| 4,564,146 | A | 1/1986 | Bleasdale |
| 4,598,182 | A | 7/1986 | Breslin |
| 4,664,317 | A | 5/1987 | Morton |
| 4,673,136 | A | 6/1987 | Bianco et al. |
| 4,683,381 | A | 7/1987 | Dufoug |
| 4,693,428 | A | 9/1987 | Raterman et al. |
| 4,706,895 | A | 11/1987 | Bricker |
| 4,709,197 | A | 11/1987 | Goldhammer et al. |
| 4,713,509 | A | 12/1987 | Chebowski |
| 4,751,603 | A | 6/1988 | Kwan |
| 4,753,323 | A | 6/1988 | Kahkipuro |
| 4,767,895 | A | 8/1988 | Parrish |
| 4,771,359 | A | 9/1988 | Link |
| 4,784,601 | A | 11/1988 | Nitta |
| 4,784,602 | A | 11/1988 | Nitta |
| 4,798,116 | A | 1/1989 | Silver et al. |
| 4,821,967 | A | 4/1989 | Moriyama |
| 4,824,029 | A | 4/1989 | Stottmann et al. |
| 4,839,533 | A | 6/1989 | Aga |
| 4,859,172 | A | 8/1989 | Nitta |
| 4,882,458 | A | 11/1989 | Berg et al. |
| 4,893,027 | A | 1/1990 | Kammerer et al. |
| 4,900,881 | A | 2/1990 | Fischer |
| 4,910,365 | A | 3/1990 | Kuo |
| 4,944,462 | A | 7/1990 | Raterman et al. |
| 4,982,058 | A | 1/1991 | Schroeder et al. |
| 5,037,033 | A | 8/1991 | Stottmann et al. |
| 5,044,270 | A | 9/1991 | Schwelling |
| 5,045,648 | A | 9/1991 | Fogleman, Sr. |
| 5,065,947 | A | 11/1991 | Farnsworth |
| 5,081,406 | A | 1/1992 | Hughes et al. |
| 5,100,067 | A | 3/1992 | Konig et al. |
| 5,135,178 | A | 8/1992 | Strohmeyer |
| 5,166,679 | A | 11/1992 | Vranish et al. |
| 5,167,374 | A | 12/1992 | Strohmeyer |
| 5,171,143 | A | 12/1992 | Sohn |
| 5,186,398 | A | 2/1993 | Vigneaux, Jr. |
| 5,207,392 | A | 5/1993 | Stangenberg et al. |
| 5,236,138 | A | 8/1993 | Stangenberg et al. |
| 5,268,553 | A | 12/1993 | Shimoji |
| 5,269,473 | A | 12/1993 | Strohmeyer et al. |
| 5,275,342 | A | 1/1994 | Galanty |
| 5,279,467 | A | 1/1994 | Lydy |
| 5,295,633 | A | 3/1994 | Kimbro et al. |
| 5,318,229 | A | 6/1994 | Brown |
| D348,431 | S | 7/1994 | Hoffman et al. |
| 5,345,138 | A | 9/1994 | Mukaidono et al. |
| 5,356,286 | A | 10/1994 | Sher |
| 5,397,890 | A | 3/1995 | Schueler et al. |
| 5,407,346 | A | 4/1995 | Sher |
| 5,421,720 | A | 6/1995 | Sher |
| 5,432,308 | A | 7/1995 | Howie, Jr. |
| 5,436,613 | A | 7/1995 | Ghosh et al. |
| 5,460,516 | A | 10/1995 | Sher |
| 5,494,229 | A | 2/1996 | Rokos et al. |
| 5,568,895 | A | 10/1996 | Webb et al. |
| 5,607,295 | A | 3/1997 | Khemarangsan |
| 5,621,290 | A | 4/1997 | Heller et al. |
| 5,636,801 | A | 6/1997 | Kroger |
| 5,655,725 | A | 8/1997 | Kroger |
| 5,662,280 | A | 9/1997 | Nishio et al. |
| 5,667,152 | A | 9/1997 | Mooring |
| 5,680,999 | A | 10/1997 | Wada |
| 5,704,776 | A | 1/1998 | Sher |
| 5,724,737 | A | 3/1998 | Stones |
| 5,775,605 | A | 7/1998 | Tsai |
| 5,788,476 | A | 8/1998 | Sher |
| 5,829,697 | A | 11/1998 | Kroger |
| 5,829,963 | A | 11/1998 | Ichikawa |
| 5,850,342 | A | 12/1998 | Nakamura et al. |
| 5,868,242 | A | 2/1999 | Hall et al. |
| 5,884,855 | A | 3/1999 | Chang |
| 5,897,065 | A | 4/1999 | Schwelling |
| 5,921,367 | A | 7/1999 | Kashioka et al. |
| D412,716 | S | 8/1999 | Kroger |
| 5,942,975 | A | 8/1999 | Sørensen |
| 5,988,542 | A | 11/1999 | Henreckson et al. |
| 6,065,696 | A | 5/2000 | Tsai |
| 6,079,645 | A | 6/2000 | Henreckson et al. |
| 6,082,643 | A | 7/2000 | Kovacs |
| 6,082,644 | A | 7/2000 | Turner |
| 6,089,482 | A | 7/2000 | Chang |
| 6,113,017 | A | 9/2000 | Tsai |
| 6,116,528 | A | 9/2000 | Schwelling |
| 6,247,828 | B1 | 6/2001 | Herst |
| D444,809 | S | 7/2001 | Chang |
| 6,260,780 | B1 | 7/2001 | Kroger et al. |
| 6,265,682 | B1 | 7/2001 | Lee |
| 6,274,828 | B1 | 8/2001 | Chu |
| 6,308,904 | B1 | 10/2001 | Chang |
| 6,325,309 | B1 | 12/2001 | Chang |
| 6,340,124 | B1 | 1/2002 | Charles et al. |
| 6,376,939 | B1 | 4/2002 | Suzuki et al. |
| 6,418,004 | B1 | 7/2002 | Mather et al. |
| 6,501,198 | B2 | 12/2002 | Taylor et al. |
| 6,536,536 | B1 | 3/2003 | Gass et al. |
| 6,550,701 | B1 | 4/2003 | Chang |
| 6,575,285 | B2 | 6/2003 | Jong |
| D481,416 | S | 10/2003 | Chang |
| 6,629,654 | B2 | 10/2003 | Neely et al. |
| 6,655,943 | B1 | 12/2003 | Peterson et al. |
| 6,676,050 | B2 | 1/2004 | Chang |
| 6,676,460 | B1 | 1/2004 | Motsenbocker |
| 6,724,324 | B1 | 4/2004 | Lambert |
| D494,607 | S | 8/2004 | Hunag |
| 6,775,018 | B1 | 8/2004 | Taniguchi |
| 6,779,747 | B2 | 8/2004 | McLean et al. |
| 6,813,983 | B2 | 11/2004 | Gass et al. |
| 6,822,698 | B2 | 11/2004 | Clapper |
| 6,826,988 | B2 | 12/2004 | Gass et al. |
| 6,834,730 | B2 | 12/2004 | Gass et al. |
| 6,857,345 | B2 | 2/2005 | Gass et al. |
| D502,713 | S | 3/2005 | Hunag |
| D502,714 | S | 3/2005 | Hunag |
| 6,877,410 | B2 | 4/2005 | Gass et al. |
| 6,880,440 | B2 | 4/2005 | Gass et al. |
| 6,920,814 | B2 | 7/2005 | Gass et al. |
| 6,922,153 | B2 | 7/2005 | Pierga et al. |
| 6,945,148 | B2 | 9/2005 | Gass et al. |
| 6,945,149 | B2 | 9/2005 | Gass et al. |
| 6,957,601 | B2 | 10/2005 | Gass et al. |
| 6,962,301 | B1 | 11/2005 | Chang |
| 6,966,513 | B2 | 11/2005 | Chang |
| 6,976,648 | B2 | 12/2005 | Chang |

| | | | |
|---|---|---|---|
| 6,978,954 | B2 | 12/2005 | Kroger et al. |
| 6,979,813 | B2 | 12/2005 | Avril |
| 6,981,667 | B2 | 1/2006 | Hunag |
| 6,983,903 | B2 | 1/2006 | Chang |
| 6,994,004 | B2 | 2/2006 | Gass et al. |
| 6,997,090 | B2 | 2/2006 | Gass et al. |
| 7,000,514 | B2 | 2/2006 | Gass et al. |
| 7,024,975 | B2 | 4/2006 | Gass et al. |
| 7,040,559 | B2 | 5/2006 | Matlin et al. |
| 7,044,410 | B2 | 5/2006 | Hunag |
| 7,048,218 | B2 | 5/2006 | Hunag |
| 7,055,417 | B1 | 6/2006 | Gass |
| 7,077,039 | B2 | 7/2006 | Gass et al. |
| 7,083,129 | B2 | 8/2006 | Beam, III |
| 7,093,668 | B2 | 8/2006 | Gass et al. |
| 7,098,800 | B2 | 8/2006 | Gass |
| 7,100,483 | B2 | 9/2006 | Gass et al. |
| 7,121,358 | B2 | 10/2006 | Gass et al. |
| 7,137,326 | B2 | 11/2006 | Gass et al. |
| 7,150,422 | B2 | 12/2006 | Wang |
| 7,171,879 | B2 | 2/2007 | Gass et al. |
| 7,171,897 | B2 | 2/2007 | Barajas et al. |
| 7,195,185 | B2 | 3/2007 | Matlin |
| 7,197,969 | B2 | 4/2007 | Gass et al. |
| 7,210,383 | B2 | 5/2007 | Gass et al |
| 7,225,712 | B2 | 6/2007 | Gass et al. |
| 7,228,772 | B2 | 6/2007 | Gass |
| 7,231,856 | B2 | 6/2007 | Gass et al. |
| 7,284,467 | B2 | 10/2007 | Gass et al. |
| 7,290,472 | B2 | 11/2007 | Gass et al. |
| 7,308,843 | B2 | 12/2007 | Gass et al. |
| 7,311,276 | B2 | 12/2007 | Matlin et al. |
| 7,328,752 | B2 | 2/2008 | Gass et al. |
| 7,344,096 | B2 | 3/2008 | Matlin et al. |
| D583,859 | S | 12/2008 | Holderfield et al. |
| D584,342 | S | 1/2009 | Parratt et al. |
| D591,335 | S | 4/2009 | Holderfield et al. |
| 7,631,822 | B2 | 12/2009 | Matlin et al. |
| 7,631,823 | B2 | 12/2009 | Matlin et al. |
| 7,631,824 | B2 | 12/2009 | Matlin et al. |
| 7,635,102 | B2 | 12/2009 | Matlin et al. |
| 2001/0030114 | A1 | 10/2001 | Thielman |
| 2002/0002942 | A1 | 1/2002 | Abraham et al. |
| 2002/0017175 | A1 | 2/2002 | Gass et al. |
| 2002/0017176 | A1 | 2/2002 | Gass et al. |
| 2002/0017178 | A1 | 2/2002 | Gass et al. |
| 2002/0017179 | A1 | 2/2002 | Gass et al. |
| 2002/0017180 | A1 | 2/2002 | Gass et al. |
| 2002/0017181 | A1 | 2/2002 | Gass et al. |
| 2002/0017182 | A1 | 2/2002 | Gass et al. |
| 2002/0017183 | A1 | 2/2002 | Gass et al. |
| 2002/0017184 | A1 | 2/2002 | Gass et al. |
| 2002/0017336 | A1 | 2/2002 | Gass et al. |
| 2002/0020261 | A1 | 2/2002 | Gass et al. |
| 2002/0020262 | A1 | 2/2002 | Gass et al. |
| 2002/0020263 | A1 | 2/2002 | Gass et al. |
| 2002/0020265 | A1 | 2/2002 | Gass et al. |
| 2002/0056348 | A1 | 5/2002 | Gass et al. |
| 2002/0056349 | A1 | 5/2002 | Gass et al. |
| 2002/0056350 | A1 | 5/2002 | Gass et al. |
| 2002/0059853 | A1 | 5/2002 | Gass et al. |
| 2002/0059854 | A1 | 5/2002 | Gass et al. |
| 2002/0059855 | A1 | 5/2002 | Gass et al. |
| 2002/0066346 | A1 | 6/2002 | Gass et al. |
| 2002/0069734 | A1 | 6/2002 | Gass et al. |
| 2002/0111702 | A1 | 8/2002 | Angel |
| 2002/0139877 | A1 | 10/2002 | Beam, III |
| 2002/0170399 | A1 | 11/2002 | Gass et al. |
| 2002/0170400 | A1 | 11/2002 | Gass |
| 2002/0190581 | A1 | 12/2002 | Gass et al. |
| 2003/0002942 | A1 | 1/2003 | Gass et al. |
| 2003/0005588 | A1 | 1/2003 | Gass et al. |
| 2003/0015253 | A1 | 1/2003 | Gass et al. |
| 2003/0019341 | A1 | 1/2003 | Gass et al. |
| 2003/0037651 | A1 | 2/2003 | Gass et al. |
| 2003/0056853 | A1 | 3/2003 | Gass et al. |
| 2003/0058121 | A1 | 3/2003 | Gass et al. |
| 2003/0090224 | A1 | 5/2003 | Gass et al. |
| 2003/0090226 | A1 | 5/2003 | Chen et al. |
| 2003/0196824 | A1 | 10/2003 | Gass et al. |
| 2004/0008122 | A1 | 1/2004 | Michael |
| 2004/0040426 | A1 | 3/2004 | Gass et al. |
| 2004/0043696 | A1 | 3/2004 | Suzuki |
| 2004/0163514 | A1 | 8/2004 | Gass et al. |
| 2004/0173430 | A1 | 9/2004 | Gass |
| 2004/0181951 | A1 | 9/2004 | Wittke |
| 2004/0194594 | A1 | 10/2004 | Dils et al. |
| 2004/0226800 | A1 | 11/2004 | Pierga et al. |
| 2005/0039586 | A1 | 2/2005 | Gass et al. |
| 2005/0039822 | A1 | 2/2005 | Gass et al. |
| 2005/0041359 | A1 | 2/2005 | Gass |
| 2005/0132859 | A1 | 6/2005 | Hunag |
| 2005/0157203 | A1 | 7/2005 | Nakakuki et al. |
| 2005/0166736 | A1 | 8/2005 | Gass et al. |
| 2005/0218250 | A1 | 10/2005 | Matlin et al. |
| 2005/0274834 | A1 | 12/2005 | Huang |
| 2005/0274836 | A1 | 12/2005 | Chang |
| 2006/0091247 | A1 | 5/2006 | Matlin |
| 2006/0157600 | A1 | 7/2006 | Wang |
| 2006/0169619 | A1 | 8/2006 | Wang |
| 2006/0249609 | A1 | 11/2006 | Huang |
| 2008/0093487 | A1* | 4/2008 | Lee et al. .......................... 241/36 |
| 2009/0032629 | A1* | 2/2009 | Aries et al. ..................... 241/236 |
| 2009/0090797 | A1* | 4/2009 | Matlin et al. ..................... 241/28 |
| 2010/0170968 | A1* | 7/2010 | Andrews et al. ................ 241/25 |
| 2010/0213297 | A1* | 8/2010 | Sued et al. ....................... 241/36 |
| 2010/0243774 | A1* | 9/2010 | Hu et al. .......................... 241/30 |

FOREIGN PATENT DOCUMENTS

| | | |
|---|---|---|
| CN | 2383583 | 6/2000 |
| DE | 222515 | 9/1910 |
| DE | 412133 | 4/1925 |
| DE | 7818838 | 11/1979 |
| DE | 3208676 | 10/1982 |
| DE | 3247299 | 7/1984 |
| DE | 3313232 | 10/1984 |
| DE | 3540896 | 5/1987 |
| DE | 3733413 | 4/1988 |
| DE | 8619856 | 9/1988 |
| DE | 8619856.4 | 10/1988 |
| DE | 3819285 | 12/1989 |
| DE | 4014669 | 11/1991 |
| DE | 4121330 | 1/1993 |
| DE | 19519858 | 12/1996 |
| DE | 19703575 | 8/1998 |
| DE | 199-60267 | 7/2000 |
| EP | 0191137 | 8/1986 |
| EP | 0511535 | 11/1992 |
| EP | 0522071 | 1/1993 |
| EP | 0562076 | 9/1993 |
| EP | 0736886 | 10/1996 |
| EP | 855221 | 7/1998 |
| EP | 0855221 | 7/1998 |
| EP | 1069954 | 1/2001 |
| EP | 1195202 | 4/2002 |
| EP | 1442834 | 8/2004 |
| GB | 1132708 | 11/1968 |
| GB | 2096919 | 10/1982 |
| GB | 2199962 | 7/1988 |
| GB | 2203063 | 10/1988 |
| GB | 2234690 | 2/1991 |
| GB | 761607 | 11/1996 |
| JP | 52011691 | 1/1977 |
| JP | 570-76734 | 5/1982 |
| JP | 57076734 | 5/1982 |
| JP | 62146877 | 6/1987 |
| JP | 03143552 | 6/1991 |
| JP | 3143552 | 6/1991 |
| JP | 04110143 | 4/1992 |
| JP | 4110143 | 4/1992 |
| JP | 04157093 | 5/1992 |
| JP | 04180852 | 6/1992 |
| JP | 05014164 | 1/1993 |
| JP | 05068906 | 3/1993 |
| JP | 05092144 | 4/1993 |
| JP | 05123593 | 5/1993 |
| JP | 05211691 | 8/1993 |
| JP | 05280243 | 8/1993 |

| | | | |
|---|---|---|---|
| JP | 06137104 | | 5/1994 |
| JP | 06277548 | | 10/1994 |
| JP | 07039778 | | 2/1995 |
| JP | 07136539 | | 5/1995 |
| JP | 07155629 | A2 | 6/1995 |
| JP | 07157012 | A2 | 6/1995 |
| JP | 07299377 | A2 | 11/1995 |
| JP | 07328469 | A2 | 12/1995 |
| JP | 09070551 | A2 | 3/1997 |
| JP | 09075763 | A2 | 3/1997 |
| JP | 09075763 | A2 | 3/1997 |
| JP | 09139161 | A2 | 5/1997 |
| JP | 09262491 | A2 | 10/1997 |
| JP | 10-048344 | | 2/1998 |
| JP | 10034003 | A2 | 2/1998 |
| JP | 10048344 | A2 | 2/1998 |
| JP | 10-089592 | | 4/1998 |
| JP | 10089592 | A2 | 4/1998 |
| JP | 11216383 | A2 | 8/1999 |
| JP | 20076014 | | 3/2000 |
| JP | 20346288 | | 12/2000 |
| JP | 2001150383 | A2 | 6/2001 |
| JP | 2001-349139 | | 12/2001 |
| JP | 21349139 | | 12/2001 |
| JP | 24321993 | | 11/2004 |
| JP | 2004321993 | A2 | 11/2004 |
| JP | 26075831 | | 3/2006 |
| JP | 2007-075822 | | 3/2007 |
| JP | 27075822 | | 3/2007 |
| JP | 8001026 | | 8/2011 |
| WO | WO8403650 | | 9/1984 |
| WO | WO9101860 | | 2/1991 |
| WO | WO92/00159 | | 1/1992 |
| WO | WO9306570 | | 4/1993 |
| WO | WO9308356 | | 4/1993 |
| WO | WO94/13441 | | 6/1994 |
| WO | WO9413441 | | 6/1994 |
| WO | WO9613362 | | 5/1996 |
| WO | WO9637350 | | 11/1996 |
| WO | WO9852728 | | 11/1998 |
| WO | WO0048283 | | 8/2000 |
| WO | WO02060588 | | 8/2002 |
| WO | WO02/082613 | | 10/2002 |
| WO | WO03006213 | | 1/2003 |
| WO | PCT/US2005/028290 | | 8/2005 |
| WO | WO2005/084861 | | 9/2005 |
| WO | WO2005097331 | | 10/2005 |
| WO | WO2005107951 | | 11/2005 |
| WO | WO2006049784 | | 2/2006 |
| WO | WO2006/031324 | | 3/2006 |
| WO | WO2006031324 | | 3/2006 |
| WO | WO2006074122 | | 7/2006 |
| WO | WO2007/060698 | | 5/2007 |
| WO | WO2007/109753 | | 9/2007 |
| WO | WO2008/011517 | | 1/2008 |
| WO | WO2008/014276 | | 1/2008 |
| WO | WO2008/042538 | | 4/2008 |
| WO | WO2008/064392 | | 6/2008 |

OTHER PUBLICATIONS

The Limitations of Radiofrequency Presence Sensing Device, US Dept. of Labor, OSHA, Sep. 21, 1987.
Charge-Transfer Touch Sensor, Quantum Research Group Ltd, 2001.
Tom Begnal, Sawstop and bandsaws might soon be an option, Taunton 2008.
Safeguarding woodworking machines and worker safety, tablesaw blade safety device, Woodweb forum, 2008.
Nils Karlsson, Theory and application of a capacitive sensor for safeguarding in industry, Dept. of Physics and Measurement Techology, Mar. 1994.
J.L. Novak & J.T. Feddema, a capacitance-based proximity sensor for whole arm obstacle avoidance, Sandia National Laboratories Albuquerque NM 87185, Dec. 1992.
D.S. Chauhan & P.H. Dehoff, a magneto-sensitive skin for robots in space, Dept. of Mechanical Engineering & Engineering Science University of North Carolina at Charlotte, Jul. 1991.
Proximity Sensors (book), Festo Didactic, Germany 2003.
Lennart Bavall & Nils Karlsson, capacitive detection of humans for safety in industry-a numerical and experimental investigation, Linkoping Institute of Tech., Sweden Oct. 1997.
concepts and techniques of machine safeguarding, US Dept. of Labor, OSHA 3067, 1992.
Designing a safe highly productive system, thefabricator.com, May 30, 2002.
Joshua Smith et al., Electric Field Sensing for graphical interfaces, May/Jun. 1998.
TI's Digital signal Controllers put brake on sawstop table saw, www.embeddedstar.com, 2005.
Doubled productivity reduced product damage, Gorbel Inc., 2003.

* cited by examiner

ANTI-PAPER JAM PROTECTION DEVICE FOR SHREDDERS

TECHNOLOGY FIELD

The present invention relates to the field of shredders, especially to the field of protection devices of shredders, in particular to an anti-paper jam protection device for shredders.

BACKGROUND TECHNOLOGY

At present, one relatively scientific protect device of commercially available common shredders is to utilize a coded disc mounted at the end of the motor shaft to detect the rotational speed of the working motor decreased due to insufficient torsion resulting from the reaction force of many pieces of paper to be shredded after they are fed into the cutting blades, so as to control the motor to stop through the control circuit of the shredder to protect the motor and driving gears.

Because the above protection device is to stop the motor when the motor decelerates or can not rotate, so as to protect the motor and driving gears, and at that time the motor has been under the overload operation, that such process occurs many times would undoubtedly result in the failure of the motor or breaking the driving gears, to make the machine can not work completely.

Another relatively scientific protect device of commercially available common shredders is to utilize an optical induction assembly mounted at the end of the contact member to detect the displacement of the coded disc resulting from the contact member pushed by many pieces of paper to be shredded before they are fed into the cutting blades, so as to control the motor to stop through the control circuit of the shredder when the change exceeds the predetermined value of the machine, to protect the motor and driving gears.

For this protection device utilizes an optical component to detect the displacement of the coded disc, and much dust would generate during the operation of the shredder, the dust would affect the detection accuracy of the optical induction assembly, namely the accuracy of the thickness of the paper, so as to result in inaccuracy and misjudgment to cause the motor to be under the overload operation, then that such process occurs many times would undoubtedly result in the failure of the motor or breaking the driving gears, to make the machine can not work completely.

The above mentioned problems of paper jam, overload and tooth breaking are main puzzles that cause shredders to be repaired frequently and used inconveniently by users.

In order to solve the above existing problems and shortcomings, it is very necessary to improve further, even innovate the protection device of common shredders.

DISCLOSURE OF THE INVENTION

Aspects of the present invention generally pertain to an anti-paper jam protection device for shredders, that anti-paper jam protection device for shredders controls the thickness of the paper to be shredded during the paper inserting stage, and shreds paper automatically only in a predetermined value range, to avoid abnormalities that result in failure of the machine such as jam and tooth breaking when the shredder is shredding many pieces of paper, so as to reduce maintenance times and cost, extend service life, and make application of shredders safer and more reliable, more convenient and simpler, then to achieve better protection of shredders.

In a first aspect of the present invention, an anti-paper jam protection device for shredders is provided. In an aspect, the anti-paper jam protection device for shredders comprises:

a paper thickness detecting device, mounted at the paper inserting passage of the shredder, and detecting a thickness of the paper inserted into the paper inserting passage;

an indicating device, mounted on the shredder and prompting the user;

a controlling device, in line connection with the paper thickness detecting device and the indicating device respectively, mounted in the shredder and in line connection with the driving component of the shredder driving the shredder blades, for controlling the driving component and the indicating device respectively according to the detecting result of the paper thickness detecting device.

In a further aspect, the paper thickness detecting device is an electromagnetic induction paper thickness detecting device.

In yet another aspect, the electromagnetic induction paper thickness detecting device comprises a contact element, an electromagnetic element and an electromagnetic induction element, the contact element is connected rotatably to the body of the shredder, one end of which is positioned in the paper inserting passage, on the other end of which is mounted the electromagnetic element, the electromagnetic induction element is mounted on the body of the shredder and spaced with the electromagnetic element face to face, and the controlling device is in line connection with the electromagnetic induction element.

In yet another aspect, the contact element is pivoted on the body of the shredder.

In yet another aspect, the body of the shredder is provided a fixed axis, the contact element has an axis hole, and the fixed axis is located in the axis hole.

In yet another aspect, the contact element is a shift lever, a cam block or a wheel disk.

In yet another aspect, the electromagnetic element is a magnet, and the electromagnetic induction element is a hall element.

In yet another aspect, it further comprises an elastic component which is connected with and props against the body of the shredder and the contact element respectively.

In yet another aspect, the elastic component is a spring or an elastic rubber.

In yet another aspect, it further comprises a fixed box fixed on the body of the shredder, the electromagnetic element is located in the fixed box, and the electromagnetic induction element is fixed in the fixed box and mounted indirectly on the body of the shredder through the fixed box.

In a further aspect, the control center of the shredder and the controlling device are integrated as a whole.

In a further aspect, the indicating device is an audible indicating device or a visional indicating device.

In yet another aspect, the audible indicating device is a loudspeaker, and the visional indicating device is a display part or an indicating lamp.

In yet another aspect, the display part is a LED display part, and the indicating lamp is a color indicating lamp, a symbol indicating lamp or a graph indicating lamp. The LED display part has the indicating function with graphs or symbols, the color indicating lamp is namely an indicating lamp having a color, and can also be marked with letters to indicate whether the paper inserted exceeds the predetermined value of the machine, the lamps having transparent sheets with graphs or symbols can also be used to prompt the users to operate.

In another aspect of the present invention, an anti-paper jam protection device for shredders is provided, and comprises:

a paper thickness detecting device, mounted at the paper inserting passage of the shredder, and detecting the thickness of the paper inserted into the paper inserting passage, the paper thickness detecting device comprising a contact element, an electromagnetic element, an electromagnetic induction element, an elastic component and a fixed box fixed on the body of the shredder, the contact element being connected rotatably to the body of the shredder, one end of which is positioned in the paper inserting passage, on the other end of which is mounted the electromagnetic element which is located in the fixed box, the elastic component being connected with and propping against the body of the shredder and the contact element respectively, and the electromagnetic induction element being fixed in the fixed box and spaced with the electromagnetic element face to face;

an indicating device, mounted on the shredder and prompting the user;

a controlling device, in line connection with the electromagnetic induction element and the indicating device respectively, mounted in the shredder and in line connection with the driving component of the shredder driving the shredder blades, for controlling the driving component and the indicating device respectively according to the detecting result of the paper thickness detecting device.

In a further aspect, the contact element is pivoted on the body of the shredder.

In yet another aspect, the body of the shredder is provided a fixed axis, the contact element has an axis hole, and the fixed axis is located in the axis hole.

In a further aspect, the contact element is a shift lever, a cam block or a wheel disk.

In a further aspect, the electromagnetic element is a magnet, and the electromagnetic induction element is a hall element.

In a further aspect, the elastic component is a spring or an elastic rubber.

In a further aspect, the control center of the shredder and the controlling device are integrated as a whole.

In a further aspect, the indicating device is an audible indicating device or a visional indicating device.

In yet another aspect, the audible indicating device is a loudspeaker, and the visional indicating device is a display part or an indicating lamp.

In yet another aspect, the display part is a LED display part, and the indicating lamp is a color indicating lamp, a symbol indicating lamp or a graph indicating lamp. The LED display part has the indicating function with graphs or symbols, the color indicating lamp is namely an indicating lamp having a color, and can also be marked with letters to indicate whether the paper inserted exceeds the predetermined value of the machine, the lamps having transparent sheets with graphs or symbols can also be used to prompt the users to operate.

The beneficial effects of the present invention are as follows:

1. The paper thickness detecting device of the present invention is mounted at the paper inserting passage of the shredder, and controls the thickness of the paper to be shredded during the paper inserting stage, once the thickness exceeds the predetermined value, the indicating device would prompts the user till the user reduces the thickness of the paper to be in the predetermined value range, and the shredder shreds paper automatically in the predetermined value range, to avoid abnormalities that result in failure of the machine such as jam and tooth breaking when the shredder is shredding many pieces of paper, so as to reduce maintenance times and cost, extend service life, and make application of shredders safer and more reliable, more convenient and simpler, then to achieve better protection of shredders;

2. The paper thickness detecting device of the present invention in particular adopts the electromagnetic element and the non-contact electromagnetic induction element which are easy to obtain, would not be affected by the media such as dust, and have a practical function;

3. The present invention has a simple and quick working process and a simple circuit, and its functional modules can be directly planted into the existing machines and adjusted slightly, then the detection of different thicknesses of paper can be performed immediately.

PREFERRED EMBODIMENTS OF THE INVENTION

In order to understand the technical content of the present invention more clearly, please refer to FIGS. 1-6.

Figure 1:
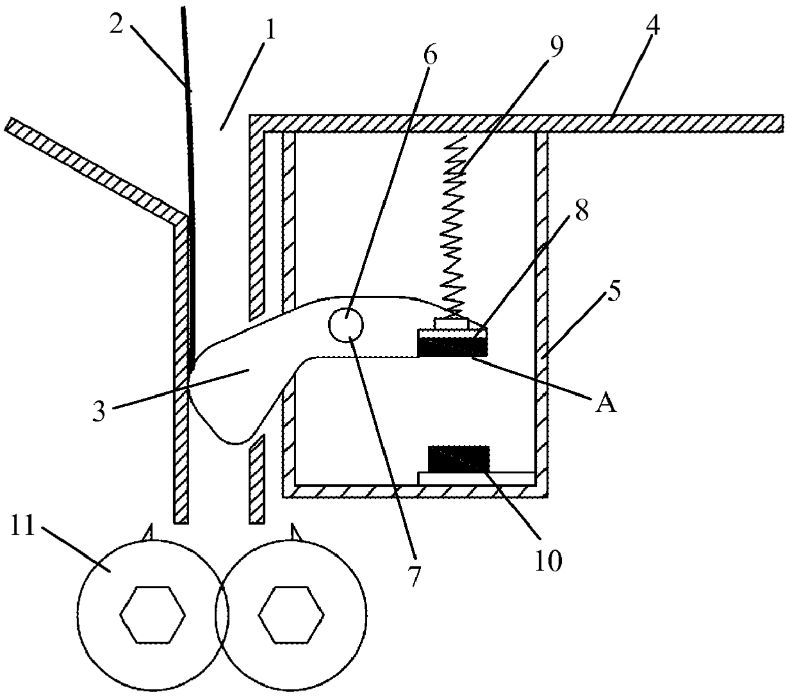
FIG. 1 is a schematic view of one embodiment of the present invention in a use condition.
Figure 2:
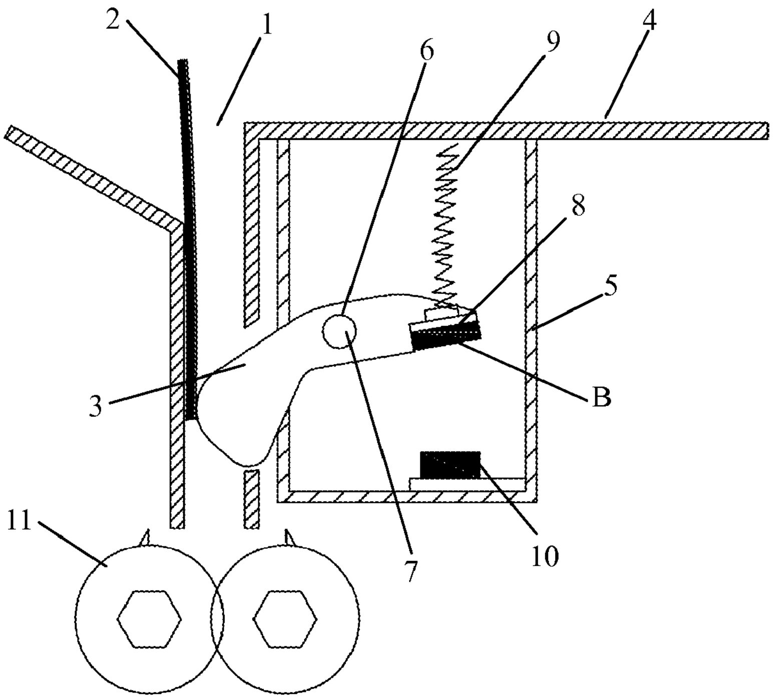
FIG. 2 is a schematic view of the embodiment in FIG. 1 in another use condition.

Please refer to FIGS. 1-2, the anti-paper jam protection device for shredders of the present invention comprises a paper thickness detecting device mounted at the paper inserting passage 1 of the shredder and detecting a thickness of the paper 2 inserted into the paper inserting passage 1, the paper thickness detecting device comprises a contact element for contacting paper, which is a shift lever 3 often used in shredders and can be also a cam block that can be pushed or a portable wheel disk structure, and a fixed box 5 fixed on the body 4 of the shredder, the fixed axis 6 provided on the body 4 of the shredder is located in the axis hole 7 in the contact element, one end of the contact element is positioned in the paper inserting passage 1, on the other end of the contact member is mounted the electromagnetic element 8 which is a magnet herein, the electromagnetic element 8 is located in the fixed box 5, the elastic component 9 is connected with and propping against the body 4 of the shredder and the contact element respectively, the elastic component 9 herein is a compressed spring which can prop against the inserted paper 2 so as to cause it not to affect the thickness detection when the paper 2 is relatively more and fluffy, it also can be an elastic rubber, and the electromagnetic induction element 10 is fixed in the fixed box 5 and spaced with the electromagnetic element 8 face to face, and is a hall element herein; an indicating device is mounted on the shredder and prompting the user; the controlling device is in line connection with the electromagnetic induction element 10 and the indicating device respectively, mounted in the shredder and in line connection with the driving component of the shredder driving the cutter assembly 11, for controlling the driving component and the indicating device respectively according to the detecting result of the paper thickness detecting device.

In a further aspect, the contact element is pivoted on the body of the shredder.

In a further aspect, the indicating device is an audible indicating device or a visional indicating device.

In yet another aspect, the audible indicating device is a loudspeaker, and the visional indicating device is a display part or an indicating lamp.

In yet another aspect, the display part is a LED display part, and the indicating lamp is a color indicating lamp, a symbol indicating lamp or a graph indicating lamp. In one embodiment of the present invention, the indicating device adopts the color indicating lamps 12 shown in FIG. 5, and can adopt the LED display part 13 shown in FIG. 6 which uses symbols or graphs indicating the mount of paper to correspond to the mount of paper that should be reduced, which makes the operation of the user simpler and more imaginal.

Figure 5:
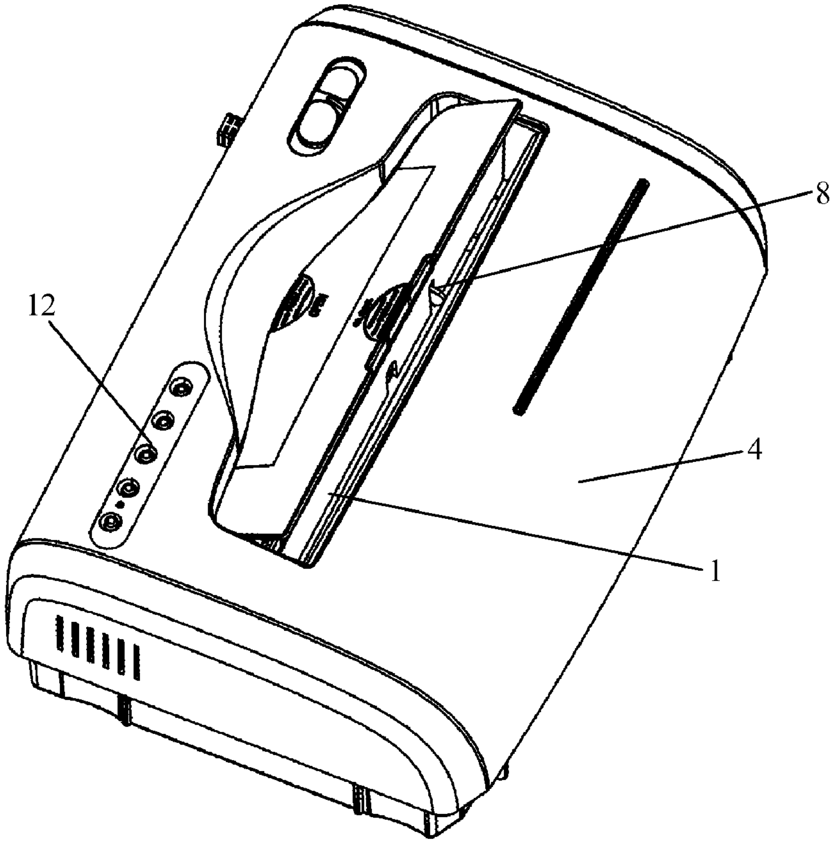
FIG. 5 is a stereogram of one embodiment of the present invention installed in the shredder.
Figure 6:
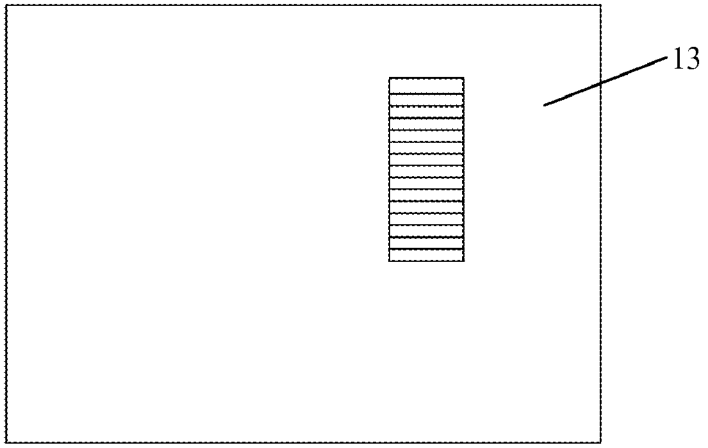
FIG. 6 is a front view of another embodiment of the indicating device of the present invention.

With the present invention, when the paper 2 the thickness of which is less than the predetermined value of the controlling device is inserted into the paper inserting passage 1, as shown in FIG. 1 the electromagnetic element 8 is at the position A, and the electromagnetic induction element 10 keeps on detecting the thickness for the thickness of the inserted paper does not exceed the predetermined value of the controlling device, the paper 2 then is fed into the cutter assembly 11 and shredded; when the thickness of the paper 2 is more than the predetermined value of the controlling device, due to the change in electromagnetic quantities caused by the displacement of the electromagnetic element 8 the electromagnetic induction element 10 signals the controlling device to control the motor not to work, so as to control the cutter assembly 11 not to rotate to shred paper, as shown in FIG. 2, the electromagnetic element 8 is now at the position B, and at the same time the indicating device is lightened, as shown in FIG. 5. The user can reduce the paper in the paper inserting passage 1 to make its thickness less than the predetermined value according to the colors, graphs or symbols of the indicating device, and then the controlling device would control the cutter assembly 11 to rotate to shred the paper.

Figure 3:
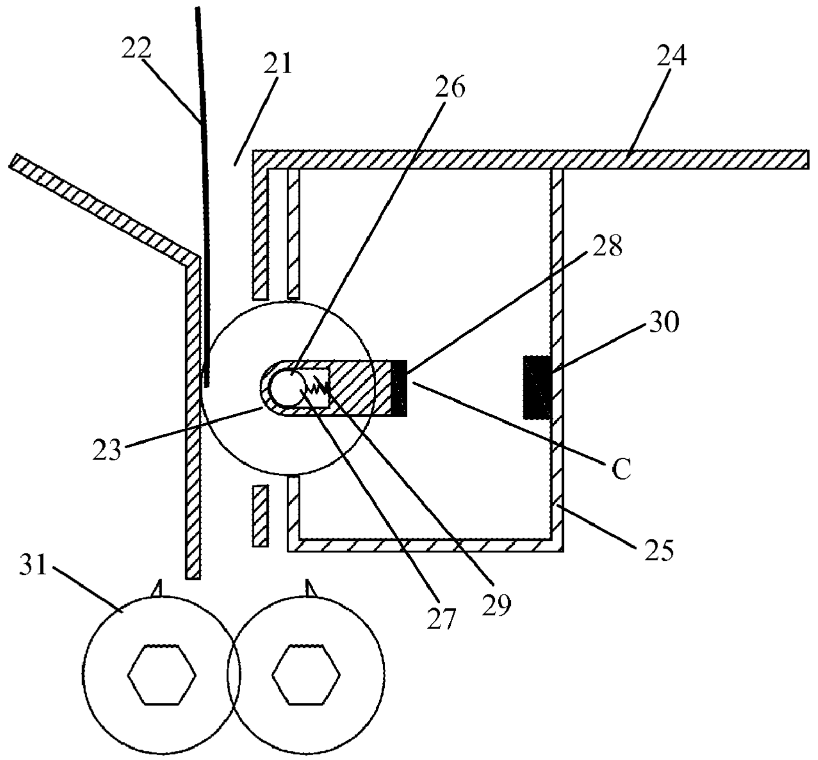
FIG. 3 is a schematic view of another embodiment of the present invention in a use condition.
Figure 4:
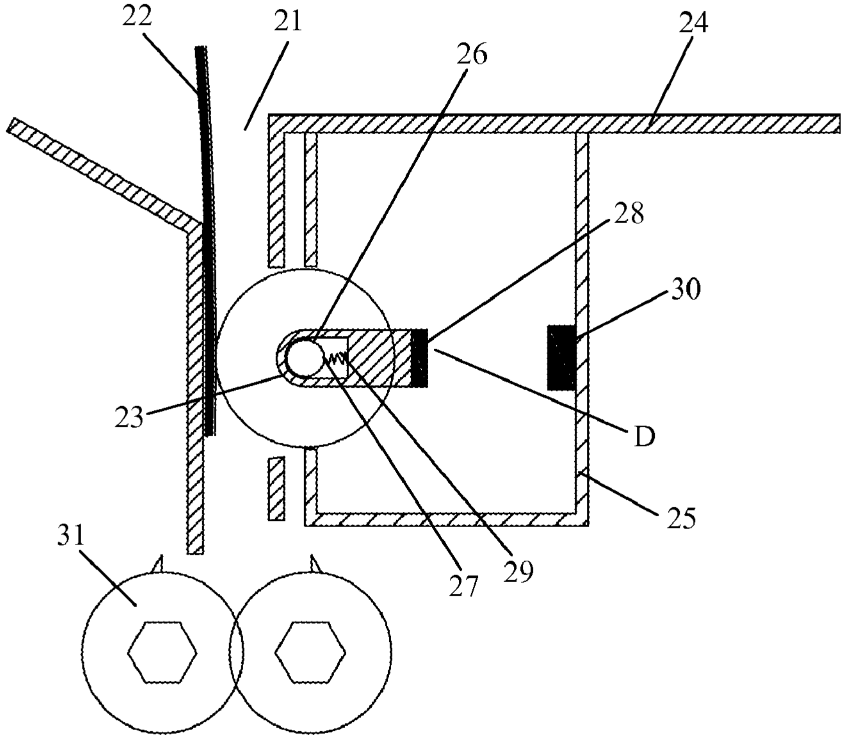
FIG. 4 is a schematic view of the embodiment in FIG. 3 in another use condition.

Please refer to FIG. 3-4, the anti-paper jam protection device for shredders of the present invention comprises a paper thickness detecting device mounted at the paper inserting passage 21 of the shredder and detecting a thickness of the paper 22 inserted into the paper inserting passage 21, the paper thickness detecting device comprises a contact element for contacting paper, which is a portable wheel disk structure 23 and can be also a shift lever 3 often used in shredders or a cam block that can be pushed, and a fixed box 25 fixed on the body 24 of the shredder, the fixed axis 26 provided on the body 24 of the shredder is located in the axis hole 27 in the contact element, one end of the contact element is positioned in the paper inserting passage 22, on the other end of the contact member is mounted the electromagnetic element 28 which is a magnet herein, the electromagnetic element 28 is located in the fixed box 25, the elastic component 29 is connected with and propping against the body 24 of the shredder and the contact element respectively, the elastic component 29 herein is a compressed spring which can prop against the inserted paper 2 so as to cause it not to affect the thickness detection when the paper 2 is relatively more and fluffy, it also can be an elastic rubber, and the electromagnetic induction element 30 is fixed in the fixed box 25 and spaced with the electromagnetic element 28 face to face, and is a hall element herein; an indicating device is mounted on the shredder and prompting the user; the controlling device is in line connection with the electromagnetic induction element 30 and the indicating device respectively, mounted in the shredder and in line connection with the driving component of the shredder driving the cutter assembly 31, for controlling the driving component and the indicating device respectively according to the detecting result of the paper thickness detecting device.

In a further aspect, the contact element is pivoted on the body of the shredder.

In a further aspect, the indicating device is an audible indicating device or a visional indicating device.

In yet another aspect, the audible indicating device is a loudspeaker, and the visional indicating device is a display part or an indicating lamp.

In yet another aspect, the display part is a LED display part, and the indicating lamp is a color indicating lamp, a symbol indicating lamp or a graph indicating lamp. In one embodiment of the present invention, the indicating device adopts the color indicating lamps 12 shown in FIG. 5, and can adopt the LED display part 13 shown in FIG. 6 which uses symbols or graphs indicating the mount of paper to correspond to the mount of paper that should be reduced, which makes the operation of the user simpler and more imaginal.

With the present invention, when the paper 22 the thickness of which is less than the predetermined value of the controlling device is inserted into the paper inserting passage 31, as shown in FIG. 3 the electromagnetic element 28 is at the position C, and the electromagnetic induction element 30 keeps on detecting the thickness for the thickness of the inserted paper does not exceed the predetermined value of the controlling device, the paper 22 then is fed into the cutter assembly 31 and shredded; when the thickness of the paper 22 is more than the predetermined value of the controlling device, due to the change in electromagnetic quantities caused by the displacement of the electromagnetic element 28 the electromagnetic induction element 30 signals the controlling device to control the motor not to work, so as to control the cutter assembly 31 not to rotate to shred paper, as shown in FIG. 4, the electromagnetic element 28 is now at the position D, and at the same time the indicating device is lightened, as shown in FIG. 5. The user can reduce the paper in the paper inserting passage 21 to make its thickness less than the predetermined value according to the colors, graphs or symbols of the indicating device, and then the controlling device would control the cutter assembly 31 to rotate to shred the paper.

To sum up, the anti-paper jam protection device for shredders of the present invention controls the thickness of the paper to be shredded during the paper inserting stage, and shreds paper automatically only in a predetermined value range, to avoid abnormalities that result in failure of the machine such as jam and tooth breaking when the shredder is shredding many pieces of paper, so as to reduce maintenance times and cost, extend service life, and make application of shredders safer and more reliable, more convenient and simpler, then to achieve better protection of shredders.

While the present invention has been particularly shown and described with references to preferred embodiments thereof, it will be understood by those skilled in the art that various changes in form and details may be made therein without departing from the spirit and scope of the invention as defined by the claims. It is clearly understood therefore that the same is by way of illustration and example only and is not to be taken by way of limitation.

I claim:

1. An anti-paper jam protection device for shredders, comprising:

a paper thickness detecting device, mounted at the paper inserting passage of the shredder, and detecting the thickness of the paper inserted into the paper inserting passage, the paper thickness detecting device comprising a contact element, an electromagnetic element, an electromagnetic induction element, an elastic component and a fixed box fixed on the body of the shredder, the contact element being connected rotatably to the body of the shredder, one end of which is positioned in the paper inserting passage, on the other end of which is mounted the electromagnetic element which is located in the fixed box, the elastic component being connected with and propping against the body of the shredder and the contact element respectively, and the electromagnetic induction element being fixed in the fixed box and spaced with the electromagnetic element face to face;

an indicating device, mounted on the shredder and prompting the user;

a controlling device, in line connection with the electromagnetic induction element and the indicating device respectively, mounted in the shredder and in line connection with the driving component of the shredder driving the shredder blades, for controlling the driving component and the indicating device respectively according to the detecting result of the paper thickness detecting device.

2. The anti-paper jam protection device for shredders according to claim 1, wherein the contact element is pivoted on the body of the shredder.

3. The anti-paper jam protection device for shredders according to claim 2, wherein the body of the shredder is provided a fixed axis, the contact element has an axis hole, and the fixed axis is located in the axis hole.

4. The anti-paper jam protection device for shredders according to claim 1, wherein the contact element is a shift lever, a cam block or a wheel disk.

5. The anti-paper jam protection device for shredders according to claim 1, wherein the electromagnetic element is a magnet, and the electromagnetic induction element is a hall element.

6. The anti-paper jam protection device for shredders according to claim 1, wherein the elastic component is a spring or an elastic rubber.

7. The anti-paper jam protection device for shredders according to claim 1, wherein the control center of the shredder and the controlling device are integrated as a whole.

8. The anti-paper jam protection device for shredders according to claim 1, wherein the indicating device is an audible indicating device or a visional indicating device.

9. The anti-paper jam protection device for shredders according to claim 8, wherein the audible indicating device is a loudspeaker, and the visional indicating device is a display part or an indicating lamp.

10. The anti-paper jam protection device for shredders according to claim 9, wherein the display part is a LED display part, and the indicating lamp is a color indicating lamp, a symbol indicating lamp or a graph indicating lamp.

* * * * *